2,888,354
Patented May 26, 1959

1

2,888,354

COMPOSITIONS SUITABLE FOR MAKING REFRACTORY ARTICLES

Eric Smith, Gerrards Cross, and John Stratton Turnbull, Bowdon, England, assignors to Metropolitan-Vickers Electrical Company Limited, London, England, a British company No Drawing. Application September 12, 1955
Serial No. 533,908

Claims priority, application Great Britain
September 23, 1954

5 Claims. (Cl. 106—38.22)

This invention relates to compositions suitable for making refractory articles and to the production of articles from them.

Refractory moulds for casting metals which melt at high temperatures, and other refractory articles such as refractory bricks, blocks, cores and linings, are usually prepared by mixing a powdered refractory material of suitably fine particle size with a liquid binding medium which sets after an appropriate time has elapsed, forming the mixture into the desired shape, and when the binding medium has set, drying where necessary and firing the article. The mixture of powdered refractory material and binding medium can be used to form the whole of the mould (or other article), to form the surface of the mould only, to provide the surface and at the same time form the matrix for coarser refractory material in the interior of the mould, and to form shell-moulds which are built up on removable patterns.

Various liquid binding media have been proposed for making refractory articles, and a particularly suitable medium is a silica sol (or colloidal solution of silica), the use of which in making refractory moulds is described in British Specification No. 594,671. These sols are readily induced to gel by the addition of suitable accelerators, and the time in which gelation takes place can readily be controlled. When silica sols are used to bind refractory materials, and the mixture is formed into the desired shape, the gelled mixture is sufficiently strong for handling and forms an excellent refractory on drying and firing, for the silica provided by the silica sol itself contributes to the refractory properties of the product.

In using a silica sol as a binding medium, an appropriate quantity of the sol (in practice it is an aqueous silica sol) is mixed with the powdered refractory material to form a slurry. A gelation accelerator, if required, can be added at the time of mixing of the slurry, or the slurry can be kept until it is to be used and the accelerator added then. In some instances, a gelation accelerator is unnecessary, for example in dip coating of patterns in the manufacture of refractory moulds, where the coating on the pattern is allowed to dry, thus gelling the sol, and the pattern may be dipped repeatedly in this way until an adequate thickness of gelled slurry is built up on it. The consistency of the slurry depends on the size of the particles of the refractory material and the proportion of silica sol employed, and the particular consistency of the slurry used will depend in any given instance on the way in which it is to be formed into shape. If the slurry is to be shaped round a pattern by vibration under gravity, then it can be much thicker than if it is to be used as a dip coating in the formation of the surface of the refractory article only: if the slurry is to be applied to a pattern in the form of a spray, it will need to be sufficiently thin to be sprayed.

In some instances the slurry is used immediately after mixing, but there are many occasions when it is convenient to make up a quantity of slurry and use it over a period of several days. In the formation of surfaces of refractory moulds by dip coating, for example, it is convenient to make up a large quantity of slurry and to maintain it in a bath into which the pattern is to be dipped. More slurry is added from time to time to maintain the level in the bath as its contents are used up and the bath may be in continuous use for several days or even weeks.

In such instances where the slurry is a thin one and is used over a considerable period, it is of course highly desirable that it should retain its original properties as far as possible, and in particular that the refractory particles in suspension should not settle out so that the slurry is no longer homogeneous. In practice, however, it is found that there is a tendency for refractory particles suspended in a silica sol to settle out on standing. Such a change in the properties of the slurry is particularly undesirable when the slurry is to be used for spraying or dip coating, for the coating of slurry taken up by the patterns used will vary with time both in thickness and in constitution.

It has now been discovered that if a non-ionic or cationic surface-active agent is incorporated in the slurry of silica sol and refractory particles, and the pH of the resulting mixture is adjusted appropriately where necessary, the tendency for the refractory particles to settle out can be markedly reduced.

According to the invention, therefore, a composition suitable for making refractory articles comprises a slurry of a silica sol, a powdered refractory material, and a minor proportion of a non-ionic or cationic surface-active agent, the slurry having a pH value such that it remains homogeneous on standing.

Silica sols which are suitable for use in the compositions of the invention include those which have been obtained by the ion-exchange process from sodium silicate, or by the so-called autoclave process employing a silica gel, such as the silica sols described in British specification Nos. 607,696; 645,703; 649,897; 654,850; and 662,423. The concentration of silica in the silica sol used is preferably from 10% to 30% by weight, and about 15% is particularly suitable. The silica sols sold under the registered trademark "Syton," such as those known as "Syton O," "Syton W–20" and "Syton 2X," which contain 15%, 15% and 30% by weight of silica respectively, are particularly suitable, and the 30% sol can if required be diluted with water to provide a 15% sol for direct use.

The powdered refractory material used will, of course, not be one which is sufficiently acidic or basic to cause the silica sol to gel rapidly. Suitable refractory materials are alumina, Carborundum, chromite, silica itself, and silicates such as zirconium silicate and sillimanite. The particle size of the powdered refracory material is preferably such that the powder will pass through a British Standard sieve of 200 mesh to the inch.

Suitable non-ionic surface-active agents are those obtained by condensing an alkylene oxide, such as ethylene oxide, with an organic substance containing a large non-polar group and an active hydrogen atom. Among these may be mentioned the condensation products of ethylene oxide with long-chain fatty alcohols (such as the product sold under the name "Lubrol W"), the condensation products of ethylene oxide with alkylphenols, for instance an octylcresol (such as "Stergene"), and the condensation products of ethylene oxide with long-chain alkyl mercaptans, for example a dodecyl mercaptan. Another non-ionic surface-active agent which can be used is a polyethylene glycol fatty acid ester such as that sold under the name "Nonex 99."

Examples of cationic surface-active agents which can be used are the quaternary ammonium salts such as the cetylpyridinium bromide sold under the name "Fixanol C," and cetyltrimethylammonium bromide.

The stability of a slurry is greatly influenced by its pH, and where necessary the pH must be suitably adjusted, by addition to acid for instance, after the ingredients have been mixed. The most suitable pH for stability varies unpredictably with the particular production batch of silica sol used but it can easily be found by simple testing. Usually with a non-ionic surface-active agent the pH which is suitable will be on the alkaline side of neutrality, but it may be found that comparatively low pH values are acceptable when the proportion of non-ionic surface-active agent present is small.

In some instances where non-ionic surface-active agents have been used in the practice of the invention it has been found that the viscosity of the slurry produced increases markedly on standing, although the silica sol does not gel. This behaviour appears to depend to a considerable extent on the pH of the slurry. Such a change in the properties of a slurry can under certain circumstances be undesirable, but it has been discovered that, where a non-ionic surface-active agent is used, then by incorporating in addition an anionic surface-active agent it is possible either to reduce any tendency of the slurry to thicken or increase in viscosity on standing, or to reduce to the desired extent the viscosity of a slurry which has already thickened. As anionic surface-active agents which may be used in conjunction with the non-ionic surface-active agents there may be mentioned the alkylaryl sulphonates such as sodium dodecyl benzene sulphonate, the salts of alkyl hydrogen sulphates, such as sodium lauryl sulphate and sodium cetyl sulphate and the commercial detergents sold under the names "Teepol" and "Iranopol," and the alkyl sulphosuccinates, such as sodium dioctyl sulphosuccinate and the substance sold under the name "Alcopol O."

Another method of reducing thickening which has already occurred is to increase the pH of the slurry by the careful addition of alkali, for example, ammonia. Care must be taken, of course, to see that the amount of alkali added is not such as to destroy the non-settling character of the slurry. Alternatively the thickness of the slurry can be readjusted by the incorporation of more silica sol and refractory material.

The proportions of silica sol to powdered refractory material and any added water used will depend in any given instance on the consistency of the slurry desired. Where a non-ionic surface-active agent is employed, from 0.05% to 1% of surface-active agent by weight of slurry is usually sufficient, and where a cationic surface-active agent is used, even smaller quantities are suitable. The amount of the anionic surface-active agent which may be used to reduce the thickening of a slurry in which a non-ionic surface-active agent is present is usually only a small proportion by weight of the non-ionic substance. The exact proportions of surface-active agent suitable in any given instance can be found by a process of simple testing.

It is to be understood that the use of the compositions of the invention in making refractory articles, and the refractory articles thus obtained are to be regarded as within the scope of the present invention.

The invention has an important application in the precision casting process described in U.S. patent application Serial No. 319,776, filed November 10, 1952, which issued December 10, 1957, into U.S. Patent No. 2,815,552, and the improvement in or modification of it described in U.S. patent application Serial No. 512,311, filed May 31, 1955.

The invention is illustrated by the following examples:

*Example 1*

This example illustrates the preparation and properties of a composition in the form of a slurry suitable for use as a dipcoat, comprising zirconium silicate, a non-ionic surface-active agent, and the colloidal solution of silica sold under the name "Syton C," prepared by the so-called autoclave process and containing 15% by weight of $SiO_2$.

Comminuted zirconium silicate passing No. 200 B.S.S. mesh (175 g.; the material used was that sold under the name "Zircosil 200") was added in portions with vigorous mechanical stirring to Syton C (60 cc.; pH 9.75) to which had been added 1.5 cc. of an aqueous solution containing 50% by weight of the non-ionic surface-active agent sold under the name "Stergene" (a condensation product of ethylene oxide and octyl cresol). Stirring was continued for 10 minutes after the addition of zirconium silicate had been completed, and the slurry obtained was allowed to stand overnight. Its properties were then observed as follows:

(1) The pH of the slurry was determined.

(2) The slurry was stirred vigorously for a few minutes and was allowed to stand for one hour. The time taken for a measured volume of the slurry at a temperature of 20° C. to flow from a 50 cc. graduated pipette held vertically was then determined. The observed time was a measure the relative viscosity of the slurry. (The time taken for an equal volume of water to flow from the pipette under identical conditions was found to be 30 seconds.)

(3) The slurry was stirred vigorously for a few minutes and was then poured into an open vessel to give a layer 1¾ inches deep, which was allowed to stand for 1 hour. A micro-spatula was held in a vertical position above the surface of the slurry with its lower extremity just touching the surface, and was released and allowed to move downwards through the slurry under its own weight. The depth to which the lower extremity of the spatula penetrated the slurry indicated the extent to which any formation of a hard lower layer of zirconium silicate had occurred as a result of settling.

(4) The slurry was allowed to stand for a number of days, and after having been stirred for a few minutes was allowed to stand for a further 1 hour and was then inspected to determine whether any hard lower layer of zirconium silicate was present. The flow time of the slurry was then determined in order to find whether any thickening had occurred during the period of standing. The results of tests carried out on three independently prepared slurries are shown in the following table. The initial pH of the colloidal solution of silica used in each instance was 9.75, and the slurries were in all cases homogeneous after they had been allowed to stand for the number of days indicated.

| Slurry | pH of slurry | Properties after standing overnight | | Properties after standing for several days | |
|---|---|---|---|---|---|
| | | Flow Time | Spatula penetration, inches | No. of days standing | Flow Time (seconds) |
| A | 9.25 | 56 | 1¾ | 9 | 72 |
| | | | | 5 | 63 |
| B | 9.0 | 56 | 1¾ | 9 | 80 |
| | | | | 12 | 91 |
| C | 9.1 | 45 | 1¾ | 5 | 57 |
| | | | | 11 | 61 |

It is clear from the above table that each slurry had very satisfactory stability and showed little tendency to thicken on standing.

At the conclusion of the tests the utility of slurry C (arbitrarily chosen) as a dipcoat was investigated by dipping a stick of precision casting wax previously cleaned with acetone into the slurry and quickly removing it. The coating formed on the wax was found to be satisfactorily uniform.

Example 2

This example illustrates the effect of altering the pH of a composition initially of low utility as a dipcoat by virtue of the relatively rapid settling out of zirconium silicate particles.

The composition was prepared from zirconium silicate, Stergene and Syton C following the procedure of Example 1 except that the Syton C (again of pH 9.75) was taken from a different production batch. After all the zirconium silicate had been added and stirring had been continued for a further ten minutes, the composition (pH 8.8) was set aside. Within 1 hour it was found that an extremely hard lower layer of zirconium silicate had been formed, and the depth of penetration in the penetration test proved to be only ½ inch. The composition was left overnight, then stirred vigorously for a few minutes, allowed to stand for a further 1 hour, and re-examined by the penetration test. The depth attained was again only ½ inch.

The experiment was then repeated four times with the difference that after the addition of zirconium silicate had been completed, the pH values of the compositions were adjusted to the values 8.0, 7.7, 7.4, and 6.35 respectively by addition of hydrochloric acid. In each instance mobile homogeneous slurries very suitable for use as dipcoats were obtained after the composition had stood overnight and had then been stirred vigorously for a further 10 minutes. The result of the penetration test was 1¾ inches in each case.

Example 3

This example illustrates the preparation of a composition in the form of a slurry suitable for use as a dipcoat and containing a reduced quantity of colloidal silica.

Syton C (pH 9.65) was mixed with an equal weight of distilled water to give a solution containing 7.5% by weight of $SiO_2$. The pH of the solution was adjusted to 9.65 by addition of a little sodium hydroxide solution, and 60 cc. of the solution were used in the preparation of a slurry as in Example 1. The mobile slurry thus obtained was allowed to stand overnight, stirred vigorously for a few minutes, allowed to stand 1 hour and then subjected to the spatula penetration test, when a depth of penetration of 1¾ inches was observed.

Example 4

This example relates to the preparation of a composition using a colloidal solution of silica obtained by the ion-exchange process.

A quantity of the colloidal solution of silica sold under the name Syton 2X, containing 30% by weight of $SiO_2$ and of pH 10.0, was mixed with an equal volume of distilled water, and the pH of the solution was adjusted to 7.0 by addition of hydrochloric acid. 60 cc. of the solution were used in the preparation of a composition following the procedure of Example 1, and there was thus obtained a mobile homogeneous slurry very suitable for use as a dipcoat and giving a value of 1¾ inches in the spatula penetration test.

Attempts to prepare a composition without adjustment of the pH to 7, with or without the addition of "Stergene," resulted in the formation of an unstable slurry which rapidly deposited an extremely hard lower layer of zirconium silicate and gave a penetration of only ½ inch in the spatula penetration test.

Example 5

This example relates to the use of a cationic surface-active agent in the preparation of a composition in the form of a slurry suitable for use as a dipcoat.

A composition was prepared following the procedure of Example 1 and using Syton C of pH 10.0 except that in place of the non-ionic surface-active agent solution there was used 0.7 cc. of an aqueous solution containing 10% by weight of the cationic surface-active agent sold under the name Fixanol C (cetylpryidinium bromide). The resulting mobile homogeneous slurry (pH 9.15) gave a value of 1¾ inches in the spatula penetration test and was found to have a flow time of 85 seconds.

In a "control" experiment in which no cationic surface-active agent was used the composition obtained deposited solid rapidly and gave a penetration of only ½ inch in the penetration test.

Example 6

This and the following example illustrate the use of an anionic surface-active agent in obtaining compositions of conveniently low viscosity from thickened slurries prepared with the use of a non-ionic surface-active agent.

Zircosil 200 (175 g.) was added in portions with vigorous mechanical stirring to Syton C (60 cc.; pH 9.1) to which had been added 0.2 gram of the non-ionic surface-active agent sold under the name Nonex 99 (a polyethylene glycol fatty acid ester).

Stirring was continued for 10 minutes after the addition of zirconium silicate had been completed, and the homogeneous slurry thus obtained was allowed to stand overnight, stirred, and left for a further hour. The final slurry was homogeneous and when submitted to the spatula penetration test gave a penetration of 1¾ inches, but it was unduly thick as indicated by the flow time of 1740 seconds, and was hence of somewhat reduced utility as a dipcoat. To this slurry was then added with vigorous stirring 0.1 cc. of the anionic surface-active agent sold under the name "Alcopol O (Ordinary Grade)" (sodium dioctylsulphosuccinate), and there resulted an immediate thinning of the slurry, whose flow time proved to have been reduced to 73 seconds.

Example 7

A composition was prepared following the procedure of Example 6 using in place of the Nonex 99 1.5 cc. of an aqueous solution containing 50% by weight of Stergene. The final homogeneous but thickened slurry obtained gave a penetration of 1¾ inches and a flow time of 1,020 seconds. 0.2 cc. of an aqueous solution containing 5% by weight of a mixture of 3 parts of sodium dodecylbenzene sulphonate and 1 part of anhydrous sodium sulphate was added to the slurry with vigorous stirring, and the slurry quickly became less viscous. The flow time was found to have been reduced 60 seconds.

What we claim is:

1. A composition suitable for use in making refractory articles, consisting essentially of a slurry of a silica sol, a powdered refractory material, and a quaternary ammonium salt, the quantity of said salt being sufficient to provide a homogeneous slurry which remains homogeneous on standing for substantial periods of time.

2. A composition as claimed in claim 1, wherein the quaternary ammonium salt is selected from the group consisting of cetylpyridinium bromide and cetyltrimethylammonium bromide.

3. A composition suitable for use in making refractory articles, consisting essentially of a slurry of a silica sol, a powdered refractory material, and a non-ionic surface-active agent which is a condensation product of an alkylene oxide and an organic substance containing a large nonpolar group and an active hydrogen atom, the quantity of said agent being sufficient to provide a homogeneous slurry which remains homogeneous on standing for substantial periods of time.

4. A composition as claimed in claim 3, wherein the alkylene oxide is ethylene oxide and said organic substance is selected from the group consisting of long-chain fatty alcohols, alkylphenols, fatty acids and long-chain alkyl mercaptans.

5. A composition suitable for use in making refractory articles, consisting essentially of a slurry of a silica sol, a powdered refractory material, a non-anionic surface active agent which is a condensation product of an alkylene oxide and an organic substance containing a large non-polar group and an active hydrogen atom, the quantity of said agent being sufficient to provide a homogeneous slurry which remains homogeneous on standing for substantial periods of time, and an anionic surface active agent selected from the group consisting of alkylaryl sulphonate, alkyl hydrogen sulphate salts and alkyl sulphosuccinates, the quantity of said anionic surface-active agent being sufficient to prevent an increase in viscosity of said slurry on standing for substantial periods of time.

References Cited in the file of this patent

UNITED STATES PATENTS

| | | |
|---|---|---|
| 2,441,695 | Feagin et al. | May 18, 1948 |
| 2,587,501 | Meadors | Feb. 26, 1952 |
| 2,623,809 | Myers | Dec. 30, 1952 |
| 2,701,902 | Strachan | Feb. 15, 1955 |

FOREIGN PATENTS

| | | |
|---|---|---|
| 594,671 | Great Britain | Nov. 17, 1947 |

OTHER REFERENCES

Serial No. 426,244, Passelecq (A.P.C.), published June 1, 1943.

Iller: "Colloid Chemistry of Silica and Silicates," pub. 1955, Cornell Univ. Press, page 45.

"Atlas Spans and Atlas Tweens," December 1943; pub. by Atlas Powder Co.; page 17.